(12) United States Patent
Masuda et al.

(10) Patent No.: US 11,024,441 B2
(45) Date of Patent: Jun. 1, 2021

(54) INSULATED WIRE

(71) Applicant: DAIKIN INDUSTRIES, LTD., Osaka (JP)

(72) Inventors: Haruhisa Masuda, Settsu (JP); Yuki Adachi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 7 days.

(21) Appl. No.: 14/361,788

(22) PCT Filed: Nov. 29, 2012

(86) PCT No.: PCT/JP2012/080931
§ 371 (c)(1),
(2) Date: May 30, 2014

(87) PCT Pub. No.: WO2013/088968
PCT Pub. Date: Jun. 20, 2013

(65) Prior Publication Data
US 2014/0329087 A1 Nov. 6, 2014

(30) Foreign Application Priority Data
Dec. 14, 2011 (JP) .............................. JP2011-273424

(51) Int. Cl.
*H01B 3/42* (2006.01)
*C09D 127/18* (2006.01)
*H01B 3/30* (2006.01)
*H01B 3/44* (2006.01)
*C08L 71/00* (2006.01)
*C09D 171/00* (2006.01)
*H01B 7/02* (2006.01)

(52) U.S. Cl.
CPC ................ *H01B 3/42* (2013.01); *C08L 71/00* (2013.01); *C09D 127/18* (2013.01); *C09D 171/00* (2013.01); *H01B 3/307* (2013.01); *H01B 3/427* (2013.01); *H01B 3/445* (2013.01); *H01B 7/02* (2013.01); *C08G 2650/40* (2013.01); *Y10T 428/2927* (2015.01); *Y10T 428/2933* (2015.01)

(58) Field of Classification Search
CPC .......... C08L 27/18; C08L 71/00; C08L 71/12; C09D 127/18; C09D 171/00; C08G 2650/40; H01B 3/307; H01B 3/42; H01B 3/427; H01B 3/445; H01B 7/02; Y10T 428/2927; Y10T 428/2933
See application file for complete search history.

(56) References Cited

U.S. PATENT DOCUMENTS

| | | | |
|---|---|---|---|
| 4,001,351 A * | 1/1977 | Roura | C08J 3/005 525/197 |
| 4,578,427 A | 3/1986 | Saito | |
| 5,789,508 A * | 8/1998 | Baker | C08F 14/26 526/225 |
| 5,886,080 A | 3/1999 | Mori | |
| 5,962,376 A | 10/1999 | Yamazaki et al. | |
| 6,332,716 B1 | 12/2001 | Kato et al. | |
| 8,829,130 B2 * | 9/2014 | Xie | C08L 27/18 525/153 |
| 2004/0082701 A1 | 4/2004 | Ota et al. | |
| 2004/0242771 A1 | 12/2004 | Kubo et al. | |
| 2005/0137671 A1 * | 6/2005 | Liu | A61N 1/0568 607/122 |
| 2010/0119188 A1 | 5/2010 | Hsueh et al. | |
| 2011/0192632 A1 | 8/2011 | Abe et al. | |
| 2013/0109810 A1 | 5/2013 | Xie et al. | |
| 2014/0329968 A1 | 11/2014 | Masuda et al. | |

FOREIGN PATENT DOCUMENTS

| | | |
|---|---|---|
| CN | 101880436 | 11/2010 |
| CN | 101880436 A | 11/2010 |
| JP | 58-176242 A | 10/1983 |
| JP | 60-155275 A | 8/1985 |
| JP | 2-212539 A | 8/1990 |
| JP | 2-250208 A | 10/1990 |

(Continued)

OTHER PUBLICATIONS

Engineering Toolbox, Absolute, Dynamic and Kinematic Viscosity, retrieved Dec. 10, 2016, pp. 1-8, http://www.engineeringtoolbox.com/dynamic-absolute-kinematic-viscosity-d_412.html.*

(Continued)

*Primary Examiner* — Holly Rickman
*Assistant Examiner* — Linda N Chau
(74) *Attorney, Agent, or Firm* — Sughrue Mion, PLLC

(57) ABSTRACT

The present invention aims to provide and insulated wire having an insulation layer which is excellent in insulation properties and has a low dielectric constant. The insulated wire of the present invention includes a conductor (A) and an insulation layer (B) formed around the periphery of the conductor (A). The insulation layer (B) is formed from a resin composition containing an aromatic polyether ketone resin (I) and a fluororesin (II). The fluororesin (II) is a copolymer of tetrafluoroethylene and a perfluoroethylenic unsaturated compound represented by the following formula (1):

$$CF_2=CF-Rf^1 \qquad (1)$$

wherein $Rf^1$ represents $-CF_3$ or $-ORf^2$, and $Rf^2$ is a C1-C5 perfluoroalkyl group. The aromatic polyether ketone resin (I) and the fluororesin (II) satisfy a melt viscosity ratio (I)/(II) of 0.3 to 5.0.

5 Claims, No Drawings

(56) References Cited

FOREIGN PATENT DOCUMENTS

| | | | |
|---|---|---|---|
| JP | 5-225832 A | 9/1993 | |
| JP | 06-136255 | 5/1994 | |
| JP | 6-136255 A | 5/1994 | |
| JP | 06-136255 A | 5/1994 | |
| JP | 6-316686 A | 11/1994 | |
| JP | 8-17258 A | 1/1996 | |
| JP | 8-48887 A | 2/1996 | |
| JP | 8-291257 A | 11/1996 | |
| JP | 9-71704 A | 3/1997 | |
| JP | 9-87517 A | 3/1997 | |
| JP | 10-195302 A | 7/1998 | |
| JP | 11-5965 A | 1/1999 | |
| JP | 2870547 B2 | 3/1999 | |
| JP | 2000-169697 A | 6/2000 | |
| JP | 2002-139045 A | 5/2002 | |
| JP | 2002-146202 A | 5/2002 | |
| JP | 2002-235011 A | 8/2002 | |
| JP | 2002-323044 A | 11/2002 | |
| JP | 2003-082123 A | 3/2003 | |
| JP | 2004-137363 A | 5/2004 | |
| JP | 2006-226464 A | 8/2006 | |
| JP | 2006-274073 | 10/2006 | |
| JP | 2006-274073 A | 10/2006 | |
| JP | 2007-46064 A | 2/2007 | |
| JP | 2007-120588 A | 5/2007 | |
| JP | 2009-052028 A | 3/2009 | |
| JP | 2009-068390 | 4/2009 | |
| JP | 2009-068390 A | 4/2009 | |
| JP | 2010-067521 A | 3/2010 | |
| JP | 2010-518799 A | 5/2010 | |
| JP | 2010-123389 A | 6/2010 | |
| JP | 2010-189599 A | 9/2010 | |
| JP | 2011-159578 A | 8/2011 | |
| JP | 2011-165485 A | 8/2011 | |
| JP | WO 2012005133 A1 * | 1/2012 | ............ C08L 27/18 |
| WO | 89/00175 | 1/1989 | |
| WO | 8900175 A1 | 1/1989 | |
| WO | 03/044093 A1 | 5/2003 | |
| WO | 2013/088965 A1 | 6/2013 | |
| WO | 2013/088966 A1 | 6/2013 | |
| WO | 2013/088967 A1 | 6/2013 | |

OTHER PUBLICATIONS

International Preliminary Report on Patentability dated Jun. 17, 2014, issued by the International Searching Authority in corresponding International Application No. PCT/JP2012/080930.

International Preliminary Report on Patentability dated Jun. 17, 2014, issued by the International Searching Authority in corresponding International Application No. PCT/JP2012/080924.

International Preliminary Report on Patentability dated Jun. 17, 2014, issued by the International Searching Authority in corresponding International Application No. PCT/JP2012/080913.

International Preliminary Report on Patentability dated Jun. 17, 2014, issued by the International Searching Authority in corresponding International Application No. PCT/JP2012/080923.

International Preliminary Report on Patentability dated Jun. 17, 2014, issued by the International Searching Authority in corresponding International Application No. PCT/JP2012/080931.

International Search Report for PCT/JP2012/080913 dated Mar. 5, 2013.

Melt Mass-Flow Rate / Melt Volume-Flow Rate Article; Fleming Polymer Testing & Consulting; www.flemingptc.co.uk/our-services/mfi-mvr/.

Communication dated Apr. 22, 2015 from the European Patent Office in counterpart application No. 12857640.2.

International Search Report for PCT/JP2012/080931 dated Feb. 19, 2013.

Extended European Search Report dated May 28, 2015, issued by the European Patent Office in counterpart European application No. 12858147.7.

English Abstract of Japanese Patent Publication No. 02-250208, JP Application Published Oct. 8, 1990, 1 page.

Shenoy et al., From melt flow index to rheogram, Rheologica Acta 22:90-101, Jan. 1983.

"Victrex® PEEK 450G", Victrex® High Performance Paek Polymers, © Victrex plc Revision, Jul. 2014, pp. 1-2 (2 pages), XP 055394646.

* cited by examiner

INSULATED WIRE

CROSS REFERENCE TO RELATED APPLICATIONS

This application is a National Stage of International Application No. PCT/JP2012/080931 filed Nov. 29, 2012, claiming priority based on Japanese Patent Application No. 2011-273424 filed Dec. 14, 2011, the contents of all of which are incorporated herein by reference in their entirety.

TECHNICAL FIELD

The present invention relates to an insulated wire.

BACKGROUND ART

Electric wires used for automobiles and robots and winding for coils used in motors need to have excellent insulation properties, and they require that a conductor and an insulation layer covering the conductor therein are firmly bond to each other. Further, trends for high-voltage and high-current applications have recently been promoted, which leads to demands for electric wires and coils having insulation layers with a low dielectric constant for the purpose of preventing deterioration of insulation layers due to partial discharge. In addition, winding for motor coils mounted on automobiles needs to have high heat resistance.

In view of such situations, various studies have been performed for improving the characteristics of electric wires. For example, electric wires having an insulation layer formed from two or more resins are proposed as mentioned below.

For example, Patent Literature 1 proposes an insulated wire that has a thin insulation coating layer having a thickness of not greater than 0.2 mm formed from a resin mixture of 90 to 50% by weight of a polyether ether ketone resin and 10 to 50% by weight of a polyether imide resin.

Patent Literature 2 proposes a resin-coated electric wire and a cable having a coating layer on a conductor, wherein the coating layer is formed from a polyether ether ketone resin by extrusion, and a fluororesin layer is formed between the conductor and the polyether ether ketone resin coating layer.

Patent Literature 3 proposes an insulated wire having an insulation layer formed by applying a resin mixture and baking the mixture, wherein the resin mixture includes at least one resin selected from the group consisting of polyamide imide resin, polyimide resin, polyester imide resin, and class-H polyester resin and at least one resin selected from the group consisting of fluororesin and polysulfone resin.

Patent Literature 4 proposes an insulated wire including a first coating layer formed directly on a conductor and a second coating layer formed directly on the first coating layer, wherein the first coating layer consists of a resin composition formed by graft-polymerizing a graftable compound to an ethylene/tetrafluoroethylene copolymer, and the second coating layer consists of a resin composition which is a polymer alloy of polyphenylene sulfide resin and polyamide resin.

Patent Literature 5 proposes an insulated wire having an insulation layer consisting of a polymer alloy of polyether sulfone resin and at least one crystalline resin selected from the group consisting of polyphenylene sulfide resin and polyether ether ketone resin, wherein the ratio by weight between the polyether sulfone resin and the crystalline resin is 50:50 to 90:10.

Patent Literature 6 proposes an insulated wire having a resin layer formed by applying and baking a resin which consists of polyamide imide or polyester imide and polyphenylene ether at a ratio (by mass) of 60:40 to 95:5.

Patent Literature 7 proposes a resin composition containing polyaryl ketone resin and fluororesin as a resin composition for forming molded articles such as films and sheets.

CITATION LIST

Patent Literature

Patent Literature 1: JP H05-225832 A
Patent Literature 2: JP H08-17258 A
Patent Literature 3: JP 2010-67521 A
Patent Literature 4: JP 2011-165485 A
Patent Literature 5: JP 2010-123389 A
Patent Literature 6: JP 2011-159578 A
Patent Literature 7: JP 2006-274073 A

SUMMARY OF INVENTION

Technical Problem

Still, demands for smaller and high-power devices used for automobiles and robots and smaller and high-power motors lead to a higher density of current passing through electric wires and coils used in such devices and motors, and tend to lead to a higher density of winding. This causes a demand for electric wires achieving better performance which has never been achieved by conventional electric wires.

The present invention aims to provide an insulated wire having an insulation layer which is excellent in insulation properties and shows a low dielectric constant.

Solution to Problem

The present inventors have performed studies on an insulated wire having excellent insulation properties and a low dielectric constant, and have focused on the material of an insulation layer formed around the periphery of a conductor. Then, they have found that an insulation layer including an aromatic polyether ketone resin and a specific fluororesin has excellent insulation properties and a low dielectric constant, so that it is particularly suitable as an insulation layer of an insulated wire. As a result, the inventors have completed the present invention.

In other words, one aspect of the present invention is an insulated wire including a conductor (A), and an insulation layer (B) formed around the periphery of the conductor (A), the insulation layer (B) being formed from a resin composition including an aromatic polyether ketone resin (I) and a fluororesin (II), the fluororesin (II) being a copolymer of tetrafluoroethylene and a perfluoroethylenic unsaturated compound represented by the following formula (1):

$$CF_2=CF-Rf^1 \qquad (1)$$

wherein $Rf^1$ represents $-CF_3$ or $-ORf^2$, and $Rf^2$ represents a C1-C5 perfluoroalkyl group; the aromatic polyether ketone resin (I) and the fluororesin (II) satisfying a melt viscosity ratio (I)/(II) of 0.3 to 5.0.

The insulation layer (B) preferably satisfies that the fluororesin (II) is dispersed as particles in the aromatic polyether ketone resin (I), and the fluororesin (II) has an average dispersed particle size of not larger than 0.5 μm.

The insulation layer (B) preferably satisfies that the fluororesin (II) is dispersed as particles in the aromatic polyether ketone resin (I), and the fluororesin (II) has a maximum dispersed particle size of not larger than 1.0 μm.

The insulation layer (B) preferably satisfies that the ratio (I):(II) by mass between the aromatic polyether ketone resin (I) and the fluororesin (II) is 95:5 to 50:50.

The fluororesin (II) preferably has a melt flow rate of 0.1 to 100 g/10 min.

The aromatic polyether ketone resin (I) is preferably a polyether ether ketone.

Advantageous Effects of Invention

Since the insulated wire of the present invention has the aforementioned structure, the insulation layer (B) has excellent insulation properties and shows a low dielectric constant.

DESCRIPTION OF EMBODIMENTS

The insulated wire of the present invention includes a conductor (A) and an insulation layer (B) which is formed around the periphery of the conductor (A) and is formed from a resin composition containing an aromatic polyether ketone resin (I) and a specific fluororesin (II).

Since the insulated wire of the present invention has the above structure, the insulation layer (B) has excellent insulation properties and shows a low dielectric constant. Further, since the insulation layer (B) is formed from a resin composition containing the aromatic polyether ketone resin (I) and the fluororesin (II), it is excellent in heat resistance. It is also excellent in mechanical strength and tensile elongation. In addition, the number of fish eyes on the insulation layer (B) can be reduced, so that failure in molding the insulation layer (B) can be suppressed. As a result, the insulation layer (B) is excellent in crack resistance, and the insulated wire of the present invention is also suitable for thin lines having a thin insulation layer (B).

The insulation layer (B) formed around the periphery of the conductor (A) may be in contact with the conductor (A), or another layer, such as a resin layer, may be present between the conductor (A) and the insulation layer (B). The insulation layer (B) is preferably in contact with the conductor (A). In this case, an insulated wire with firm bonding between the conductor (A) and the insulation layer (B) is provided.

The aromatic polyether ketone resin (I) is preferably at least one resin selected from the group consisting of polyether ketone, polyether ether ketone, polyether ketone ketone, and polyether ketone ether ketone ketone. The aromatic polyether ketone resin (I) is more preferably at least one resin selected from the group consisting of polyether ketone and polyether ether ketone, and still more preferably polyether ether ketone.

The aromatic polyether ketone resin (I) preferably has a melt viscosity of 0.25 to 1.50 kNsm$^{-2}$ at 60 sec$^{-1}$ and 390° C. A melt viscosity within the above range can give improved mold-processability to the insulated wire of the present invention. The lower limit of the melt viscosity is more preferably 0.80 kNsm$^{-2}$. The upper limit of the melt viscosity is more preferably 1.30 kNsm$^{-2}$.

The melt viscosity of the aromatic polyether ketone resin (I) is measured in conformity with ASTM D3835.

The aromatic polyether ketone resin (I) preferably has a glass transition temperature of 130° C. or higher. The glass transition temperature is more preferably 135° C. or higher, and still more preferably 140° C. or higher. A glass transition temperature within the above range can give improved heat resistance to the resulting insulation layer (B). The glass transition temperature is measured using a device for differential scanning calorimetry (DSC).

The aromatic polyether ketone resin (I) preferably has a melting point of 300° C. or higher. The melting point is more preferably 320° C. or higher. A melting point within the above range can give improved heat resistance to the insulation layer (B). The melting point is measured using a device for differential scanning calorimetry (DSC).

The fluororesin (II) is a copolymer of tetrafluoroethylene (TFE) and a perfluoroethylenic unsaturated compound represented by the following formula (1):

$$CF_2\!=\!CF\!-\!Rf^1 \qquad (1)$$

wherein $Rf^1$ represents $-CF_3$ or $-ORf^2$, and $Rf^2$ represents a C1-C5 perfluoroalkyl group. The fluororesin (II) is efficiently dispersed in the aromatic polyether ketone resin (I). As a result, the insulation layer (B) in the insulated wire of the present invention shows better mechanical properties, as well as excellent insulation properties and a low dielectric constant. In addition, the insulation layer (B) and the conductor (A) are more firmly bonded to each other. For example, use of polytetrafluoroethylene causes insufficient mechanical properties and low bonding strength with the conductor (A).

The fluororesin (II) may be one fluororesin or combination of two or more fluororesins.

In the case that $Rf^1$ is $-ORf^2$, $Rf^2$ is preferably a C1-C3 perfluoroalkyl group.

The perfluoroethylenic unsaturated compound represented by the formula (1) is preferably at least one selected from the group consisting of hexafluoropropylene, perfluoro(methyl vinyl ether), perfluoro(ethyl vinyl ether), and perfluoro(propyl vinyl ether), and more preferably at least one selected from the group consisting of hexafluoropropylene and perfluoro(propyl vinyl ether).

The fluororesin (II) preferably comprises 80 to 99 mol % of TFE and 1 to 20 mol % of the perfluoroethylenic unsaturated compound represented by the formula (1). The lower limit of the amount of the TFE constituting the fluororesin (II) is more preferably 85 mol %, still more preferably 87 mol %, particularly preferably 90 mol %, and more particularly preferably 93 mol %. The upper limit of the amount of the TFE constituting the fluororesin (II) is more preferably 97 mol %, and still more preferably 95 mol %.

The lower limit of the amount of the perfluoroethylenic unsaturated compound represented by the formula (1) constituting the fluororesin (II) is more preferably 3 mol %, and still more preferably 5 mol %. The upper limit of the amount of the perfluoroethylenic unsaturated compound represented by the formula (1) constituting the fluororesin (II) is more preferably 15 mol %, still more preferably 13 mol %, particularly preferably 10 mol %, and more particularly preferably 7 mol %.

The fluororesin (II) preferably has a melt flow rate (MFR) of 0.1 to 100 g/10 min, and more preferably 10 to 40 g/10 min at 372° C. and a load of 5000 g. An MFR within the above range can give improved processability to the insulation layer (B) in the present invention. Further, such an MFR allows the insulation layer (B) and the conductor (A) to be more firmly bonded to each other. The lower limit of the MFR is still more preferably 12 g/10 min, and particularly preferably 15 g/10 min. In order to bond the insulation layer (B) and the conductor (A) firmly, the upper limit of the MFR is still more preferably 38 g/10 min, and particularly preferably 35 g/10 min.

The MFR of the fluororesin (II) is measured using a melt indexer in conformity with ASTM D3307-01.

The fluororesin (II) may have any melting point, but preferably has a melting point equal to or lower than the melting point of the aromatic polyether ketone resin (I) because, in molding, the fluororesin (II) is preferred to be already melt at the temperature where the aromatic polyether ketone resin (I) used is molten. For example, the melting point of the fluororesin (II) is preferably 230° C. to 350° C. The melting point of the fluororesin (II) is determined as a temperature corresponding to a maximum value on the heat-of-fusion curve at a temperature-increasing rate of 10° C./min using a device for differential scanning calorimetry (DSC).

The fluororesin (II) preferably has a melt viscosity of 0.3 to 3.0 $kNsm^{-2}$ at 60 $sec^{-1}$ and 390° C. A melt viscosity within this range can give improved mold-processability to the insulated wire of the present invention. The lower limit of the melt viscosity is more preferably 0.4 $kNsm^{-2}$. The upper limit of the melt viscosity is more preferably 2.0 $kNsm^{-2}$.

The melt viscosity of the fluororesin (II) is measured in conformity with ASTM D3835.

The fluororesin (II) may have been treated with fluorine gas or ammonia by a known method.

The insulation layer (B) preferably satisfies the ratio (I):(II) by mass between the aromatic polyether ketone resin (I) and the fluororesin (II) of 95:5 to 50:50. A ratio (I):(II) by mass within the above range leads to an insulation layer (B) having excellent insulation properties and heat resistance and showing a low dielectric constant. Further, such a ratio (I):(II) allows the insulation layer (B) and the conductor (A) to be firmly bonded to each other. If the ratio by mass of the fluororesin (II) to the aromatic polyether ketone resin (I) is more than 50, the bond strength between the insulation layer (B) and the conductor (A) and the heat resistance tend to be poor. If the ratio by mass of the fluororesin (II) to the resin (I) is less than 5, the dielectric constant may be disadvantageously high. The ratio (I):(II) by mass is more preferably 90:10 to 60:40.

The fluororesin (II) in the insulation layer (B) is dispersed as particles in the aromatic polyether ketone resin (I), and preferably has an average dispersed particle size of not larger than 0.5 μm. The average dispersed particle size is also preferably smaller than 0.5 μm. As the fluororesin dispersed in the aromatic polyether ketone resin (I) has an average dispersed particle size within the above range, the mechanical properties of the insulation layer (B) and the bond strength between the conductor (A) and the insulation layer (B) are markedly improved.

Too large an average dispersed particle size may lead to deterioration in mechanical properties, as well as deterioration in bond strength with the conductor (A). The average dispersed particle size may have any lower limit thereof, and the lower limit may be 0.01 μm.

The average dispersed particle size of the fluororesin (II) is more preferably 0.3 μm or smaller. An average dispersed particle size of not larger than 0.3 μm can provide an insulated wire in which the insulation layer (B) and the conductor (A) are more firmly bonded to each other. The average dispersed particle size is still more preferably not larger than 0.2 μm.

The maximum dispersed particle size of the fluororesin (II) is preferably 1.0 μm or smaller, and more preferably 0.8 μm or smaller. A maximum dispersed particle size within the above range can provide an insulation layer (B) having less fish eyes. As the fluororesin dispersed in the aromatic polyether ketone resin (I) has a maximum dispersed particle size which is smaller than the aforementioned particle size, the insulation layer (B) becomes to have better mold-processibility, and the mechanical properties and the bond strength between the conductor (A) and the insulation layer (B) are markedly improved.

The average dispersed particle size and the maximum dispersed particle size of the fluororesin (II) can be measured by microscopically observing the insulation layer (B) in the present invention using a confocal laser scanning microscope or a transmission electron microscope (TEM), and then binarizing the obtained image using an optical analysis device.

The insulation layer (B) preferably satisfies a melt viscosity ratio (I)/(II) between the aromatic polyether ketone resin (I) and the fluororesin (II) of 0.3 to 5.0. A melt viscosity ratio within this range can lead to effective dispersion of the fluororesin (II) in the aromatic polyether ketone resin (I), resulting in excellent insulation properties of the insulation layer (B). Further, such a melt viscosity ratio allows the conductor (A) and the insulation layer (B) to be more firmly bonded to each other. The melt viscosity ratio (I)/(II) is more preferably 0.4 to 4.0, and still more preferably 0.5 to 3.0. The melt viscosity ratio (I)/(II) is particularly preferably 0.5 to 2.5 because such a value can provide an insulation layer (B) having less fish eyes and to provide a fluororesin (II) having a small average dispersed particle size and maximum dispersed particle size.

The insulation layer (B) contains the aromatic polyether ketone resin (I) and the fluororesin (II), and may optionally further contain additional component(s). Any additional component(s) may be used, and examples thereof include titanium oxide, silica, alumina, barium sulfate, calcium carbonate, aluminum hydroxide, potassium titanate, magnesium oxide, calcium oxide, clay, and talc.

The insulation layer (B) may further contain any of filler, adhesiveness-imparting agents, antioxidants, lubricants, processing aids, and colorants.

The insulation layer (B) may have any thickness, and may have a thickness of 1 to 100 μm. The thickness of the insulation layer (B) may be 60 μm or smaller, or may be 40 μm or smaller. Further, the insulation layer (B) may be as thin as 30 μm or smaller. Thinning the insulation layer (B) is advantageous to provide excellent heat radiation.

The insulation layer (B) is obtained by forming a resin composition including an aromatic polyether ketone resin (I) and a specific fluororesin (II) around the periphery of the conductor (A).

For example, the insulated wire of the present invention may be produced by a method including the step of preparing a resin composition containing an aromatic polyether ketone resin (I) and a fluororesin (II) and the step of forming an insulation layer (B) around the periphery of a conductor (A) by molding the resin composition.

The resin composition of the present invention may be produced by any method, and may be produced in usual conditions using a mixer typically used for mixing a resin composition, such as a composition for molding. Examples of the mixer include mixing mills, Banbury mixers, pressure kneaders, and extruders. The mixer is preferably a twin-screw extruder, particularly, a twin-screw extruder having a screw structure with a high L/D, because such a mixer is capable of reducing the average dispersed particle size of the fluororesin (II). The screw structure of a twin-screw extruder preferably satisfies L/D=35 or higher, more preferably L/D=40 or higher, and particularly preferably L/D=45 or higher. The ratio L/D means effective length of screw (L)/screw diameter (D).

The resin composition is preferably produced by a method of mixing the aromatic polyether ketone resin (I) and the fluororesin (II) in a molten state, for example.

Sufficient kneading of the aromatic polyether ketone resin (I) and the fluororesin (II) gives a resin composition having a desired dispersion state. The dispersion state of the resin composition affects the insulation properties of the insulation layer (B) to be obtained and the adhesiveness between the insulation layer (B) and the conductor (A). Thus, an appropriate mixing method needs to be selected in order to achieve the desired dispersion state in the insulation layer (B).

The resin composition is preferably produced by a method in which the aromatic polyether ketone resin (I) and the fluororesin (II) are charged into a mixer at a proper ratio, the above additional component(s) are optionally added, and the resins (I) and (II) are melt-kneaded at their melting points or higher, for example.

The resin composition may contain additional component(s) in addition to the aromatic polyether ketone resin (I) and the fluororesin (II). The additional component(s) may be preliminarily mixed with each of the aromatic polyether ketone resin (I) and the fluororesin (II) before the kneading of the resins (I) and (II), or may be mixed with the aromatic polyether ketone resin (I) and the fluororesin (II) when these resins are mixed.

The melt-kneading temperature may be appropriately determined depending on the conditions such as the kinds of the aromatic polyether ketone resin (I) and the fluororesin (II) to be used. For example, the temperature is preferably 360° C. to 400° C. The kneading time is usually one minute to one hour.

Use of the resin composition leads to a bond strength between the insulation layer (B) obtained from the resin composition and the conductor (A) of 10 N/cm or higher. A bond strength within the above range is particularly suitable for uses such as electric wires for automobiles and winding for motor coils. The bond strength is more preferably 15 N/cm or higher, and still more preferably 20 N/cm or higher.

The insulation layer (B) may be formed by any method, and conditions for formation may be conventionally known ones. The insulation layer (B) may be formed directly on the conductor (A), or another layer such as a resin layer may be disposed therebetween.

The insulation layer (B) may be formed by a method in which the resin composition is melt-extruded onto the surface of the conductor (A) or the surface of a resin layer preliminarily formed on the conductor (A); a method in which a resin composition is melt-extruded to preliminarily form a film, the film is slit into a predetermined size, and the film is wound around the surface of the conductor (A) or the surface of a resin layer preliminarily formed on the conductor (A); or the like method.

In the case of forming an insulation layer (B) by melt-extrusion, the temperature is usually preferred to be equal to or higher than the melting point of the aromatic polyether ketone resin (I) to be used. Also, the molding temperature is preferably below the lower one of the decomposition temperature of the fluororesin (II) and the decomposition temperature of the aromatic polyether ketone resin (I). The molding temperature may be, for example, 250° C. to 400° C. The molding temperature is preferably 320° C. to 400° C.

The insulated wire of the present invention may be heated after the insulation layer (B) is formed. The heating may be performed at a temperature around the melting point of the fluororesin.

The insulated wire of the present invention includes an insulation layer (B) formed around the periphery of the conductor (A). Another layer such as a resin layer may be formed between the conductor (A) and the insulation layer (B). Further, the insulated wire of the present invention may have another layer such as a resin layer around the periphery of the insulation layer (B).

The resin layer is different from the insulation layer (B). The resin layer is preferably a layer of at least one resin selected from the group consisting of aromatic polyether ketone resin, fluororesin, polyamide imide, polyether imide, polyether sulfone, and polyphenylene sulfide.

The material of the conductor (A) may be any highly conductive material, and examples thereof include copper, copper alloy, copper-clad aluminum, aluminum, silver, gold, and zinc-plated iron.

The conductor (A) may have any shape, such as a circular shape or a planar shape. In the case of a circular conductor, the conductor (A) may have a diameter of 0.3 to 2.5 mm.

The insulated wire of the present invention may be suitably used as a wrapped electric wire, an electric wire for automobiles, an electric wire for robots, and the like. It may also be suitably used as winding (magnet wire) for coils, and the electric wire of the present invention less causes damages in winding processes. The winding is suitable for motors, rotary electric machinery, compressors, voltage converters (transformers), and the like. Thus, the winding has characteristics sufficiently tolerant to uses in high-power small motors which require a high voltage, a high current, high heat conductivity, and high-density winding. Further, the winding is also suitable as an electric wire for power distribution, power transmission, or communication.

EXAMPLES

The present invention is described referring to, but not limited to, the following examples.
<Measurement of MFR>

The mass (g/10 min) of the polymer flowing out from a nozzle (inner diameter: 2 mm, length: 8 mm) at 372° C. under a load of 5000 g was determined using a melt indexer (Toyo Seiki Seisaku-sho, Ltd.) in conformity with ASTM D3307-01.
<Measurement of Melt Viscosity>

The melt viscosity of the aromatic polyether ketone resin was measured at 60 sec$^{-1}$ and 390° C. in conformity with ASTM D3835.

The melt viscosity of the fluororesin was measured at 60 sec$^{-1}$ and 390° C. in conformity with ASTM D3835.
<Calculation of Average Dispersed Particle Size and Maximum Dispersed Particle Size>

The insulation layer of the prepared insulated wire was fixed in the sample holder of an ultramicrotome (ULTRACUT S, Leica Microsystems), and the chamber was cooled with liquid nitrogen to −80° C. inside. The insulation layer was cut such that the cross section was a portion to be observed, thereby providing an ultrathin section.

The ultrathin section obtained was taken out using a platinum ring to which a 20% ethanol solution was deposited, and then bonded to a copper mesh sheet (200 A, φ3.0 mm, Okenshoji Co., Ltd.).

The ultrathin section bonded to the copper mesh sheet was observed using a transmission electron microscope (H7100FA, Hitachi, Ltd.).

A negative film obtained by the microscopic observation was scanned into an electronic image using a scanner (GT-9400UF, SEIKO EPSON CORP.). The electronic image was then binarized using an optical analyzer (LUZEX AP, Nireco Corp.), and the average dispersed particle size and the maximum dispersed particle size of the dispersed phase were determined.

<Measurement of Relative Dielectric Constant>

A rectangular piece having a size of 2 mm in width and 100 mm in length was cut out of the resin composition of each of the following examples and comparative examples or a film formed from a polyether ether ketone single resin (thickness: 25 μm). Then, the relative dielectric constant at 1 MHz thereof was measured by a cavity resonator perturbation technique (using a dielectric constant measurement device (Kanto Electronic Application and Development Inc.), and a network analyzer (Agilent Technologies, Inc.)).

<Measurement of Volume Specific Resistivity>

Using the resin composition of each of the following examples and comparative examples or a film formed from a polyether ether ketone single resin (thickness: 25 μm), the volume specific resistivity was measured by a four-point-probe technique (using a device Loresta HP MCP-T410 (Mitsubishi Chemical Corp.)).

<Measurement of Bond Force Between Conductor and Insulation Layer>

For each of the insulated wires obtained in the following examples and comparative examples, the bond force between the conductor and the insulation layer was measured by a 180-degree peeling test using a tensile tester.

<Measurement of Number of Fish Eyes on Insulation Layer>

For each of the resin compositions of the following examples and comparative examples or a film formed from a polyether ether ketone single resin (thickness: 25 μm), the number of fish eyes within a rectangle of 12 cm×50 cm was counted.

○: Less than 10 fish eyes
Δ: Not less than 10 fish eyes but less than 30 fish eyes
x: Not less than 30 fish eyes The following materials were used in the examples and comparative examples.

Aromatic polyether ketone resin (1): Polyether ether ketone (melt viscosity: 1.19 kNsm$^{-2}$)

Aromatic polyether ketone resin (2): Polyether ether ketone (melt viscosity: 0.31 kNsm$^{-2}$)

Fluororesin (1): Tetrafluoroethylene/hexafluoropropylene copolymer (compositional ratio by weight: tetrafluoroethylene/hexafluoropropylene/perfluoro(propyl vinyl ether)=87.5/11.5/1.0, MFR: 23 g/10 min, melt viscosity: 0.55 kNsm$^{-2}$)

Fluororesin (2): Tetrafluoroethylene/hexafluoropropylene copolymer (compositional ratio by weight: tetrafluoroethylene/hexafluoropropylene/perfluoro(propyl vinyl ether)=87.5/11.5/1.0, MFR: 60 g/10 min, melt viscosity: 2.23 kNsm$^{-2}$)

Fluororesin (3): polytetrafluoroethylene (trade name: LUBRON L5, Daikin Industries, Ltd.)

Fluororesin (4): ethylene/tetrafluoroethylene copolymer (trade name: NEOFLON EP541, Daikin Industries, Ltd., melt viscosity: 2.27 kNsm$^{-2}$)

Examples 1 and 2

The aromatic polyether ketone resin (1) and the fluororesin (1) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition.

Pellets of the resulting resin composition were fed into a T-die extruder for film formation (Labo Plastomill T-die extrusion-molding device, Toyo Seiki Seisaku-sho, Ltd., φ20 mm, L/D=25, die width: 150 mm, lip width: 0.4 mm), and then molded into a 25-μm-thick film at a cylinder temperature of 370° C., a die temperature of 375° C., and a screw rotation speed of 25 rpm.

The resulting film was slit into a size of 10 mm in width and 300 mm in length, and the slit film was wrapped around the surface of a rectangular copper-wire conductor (cross section: 2.5 mm in length and 1.9 mm in width). Then, the conductor surrounded by the film was fed into an electric furnace and subjected to heat treatment at 340° C. for one minute. As a result, the film and the conductor were bonded, thereby providing an insulated wire.

Comparative Example 1

Using the aromatic polyether ketone resin (1) alone, a film and an insulated wire were produced in the same manner as in Examples 1 and 2. Then, the products were evaluated in the same manner as in Examples 1 and 2. Table 1 shows the results.

Comparative Examples 2 and 3

The aromatic polyether ketone resin (1) and the fluororesin (3) or the fluororesin (4) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition.

Next, a film and an insulated wire were produced in the same manner as in Examples 1 and 2 except that the resulting resin composition was used. Then, the products were evaluated in the same manner as in Examples 1 and 2. Table 1 shows the results.

Comparative Example 4

The aromatic polyether ketone resin (2) and the fluororesin (2) were preliminarily mixed at the ratio (parts by mass) shown in Table 1. Then, the mixture was melt-kneaded using a twin-screw extruder (φ15 mm, L/D=60) at a cylinder temperature of 390° C. and a screw rotation speed of 300 rpm, thereby producing a resin composition.

Next, a film and an insulated wire were produced in the same manner as in Examples 1 and 2 except that the resulting resin composition was used. Then, the products were evaluated in the same manner as in Examples 1 and 2. Table 1 shows the results.

TABLE 1

|  | Example 1 | Example 2 | Comparative Example 1 | Comparative Example 2 | Comparative Example 3 | Comparative Example 4 |
|---|---|---|---|---|---|---|
| Polyether ketone resin (1) (parts by mass) | 80 | 70 | 100 | 80 | 80 |  |
| Polyether ketone resin (2) (parts by mass) |  |  |  |  |  | 80 |
| Fluororesin (1) (parts by mass) | 20 | 30 |  |  |  |  |
| Fluororesin (2) (parts by mass) |  |  |  |  |  | 20 |
| Fluororesin (3) (parts by mass) |  |  |  | 20 |  |  |
| Fluororesin (4) (parts by mass) |  |  |  |  | 20 |  |
| Melt viscosity ratio (polyether ketone resin/fluororesin) | 2.16 | 2.16 | — | — | 0.52 | 0.14 |
| Average dispersed particle size (μm) | 0.19 | 0.20 | — | 73 | 2.80 | 0.42 |
| Maximum dispersed particle size (μm) | 0.44 | 0.67 | — | 210 | 8.20 | 1.19 |
| Relative dielectric constant 1 MHz | 2.6 | 2.5 | 3.0 | 2.8 | 3.0 | 2.7 |
| Volume specific resistivity (Ω · cm) | $10^{17}$ | $10^{17}$ | $10^{16}$ | $10^{16}$ | $10^{15}$ | $10^{16}$ |
| Bond force with conductor (N/cm) | 38 | 41 | 40 | 20 | 22 | 32 |
| Number of fish eyes on insulation layer | ○ | ○ | ○ | X | X | X |

The invention claimed is:

1. An insulated wire, comprising:
   a conductor (A); and
   an insulation layer (B) formed around the periphery of the conductor (A),
   the insulation layer (B) being formed from a resin composition comprising an aromatic polyether ketone resin (I) and a fluororesin (II),
   the fluororesin (II) being a copolymer of tetrafluoroethylene and a perfluoroethylenic unsaturated compound represented by the following formula (1):

$$CF_2=CF-Rf^1 \quad (1)$$

wherein $Rf^1$ represents $-CF_3$,
   the aromatic polyether ketone resin (I) and the fluororesin (II) satisfying a melt viscosity ratio (I)/(II) of 0.5 to 2.5,
   wherein the aromatic polyether ketone resin (I) is polyether ether ketone and has a melt viscosity of 0.25 to 1.30 $kNsm^{-2}$ at 60 $sec^{-1}$ and 390° C., and
   the fluororesin (II) comprises 85 to 95 mol % of tetrafluoroethylene and 5 to 15 mol % of the perfluoroethylenic unsaturated compound represented by the formula (1), and has a melt viscosity of 0.55 to 2.23 $kNsm^{-2}$ at 60 $sec^{-1}$ and 390° C.

2. The insulated wire according to claim 1,
   wherein the insulation layer (B) satisfies that the fluororesin (II) is dispersed as particles in the aromatic polyether ketone resin (I), and
   the fluororesin (II) has an average dispersed particle size of not larger than 0.5 μm.

3. The insulated wire according to claim 1,
   wherein the insulation layer (B) satisfies that the fluororesin (II) is dispersed as particles in the aromatic polyether ketone resin (I), and the fluororesin (II) has a maximum dispersed particle size of not larger than 1.0 μm.

4. The insulated wire according to claim 1,
   wherein the insulation layer (B) satisfies that a ratio (I):(II) by mass between the aromatic polyether ketone resin (I) and the fluororesin (II) is 95:5 to 50:50.

5. The insulated wire according to claim 1,
   wherein the fluororesin (II) has a melt flow rate of 0.1 to 100 g/10 min.

* * * * *